(12) United States Patent
Hannuksela et al.

(10) Patent No.: US 8,855,199 B2
(45) Date of Patent: Oct. 7, 2014

(54) METHOD AND DEVICE FOR VIDEO CODING AND DECODING

(75) Inventors: Miska Matias Hannuksela, Ruutana (FI); Ye-Kui Wang, Bridgewater, NJ (US); Ying Chen, San Diego, CA (US)

(73) Assignee: Nokia Corporation, Espoo (FI)

( * ) Notice: Subject to any disclaimer, the term of this patent is extended or adjusted under 35 U.S.C. 154(b) by 874 days.

(21) Appl. No.: 12/426,629

(22) Filed: Apr. 20, 2009

(65) Prior Publication Data

US 2010/0020871 A1     Jan. 28, 2010

Related U.S. Application Data

(60) Provisional application No. 61/046,770, filed on Apr. 21, 2008.

(51) Int. Cl.

| | |
|---|---|
| H04N 7/12 | (2006.01) |
| H04N 11/02 | (2006.01) |
| H04N 21/438 | (2011.01) |
| H04N 19/70 | (2014.01) |
| H04N 19/34 | (2014.01) |
| H04N 19/597 | (2014.01) |
| H04N 19/51 | (2014.01) |

(52) U.S. Cl.
CPC ....... *H04N 21/438* (2013.01); *H04N 19/00884* (2013.01); *H04N 19/00442* (2013.01); *H04N 19/00769* (2013.01); *H04N 19/00715* (2013.01)
USPC ................................. 375/240.12; 375/240.16

(58) Field of Classification Search
CPC .................. H04N 19/00442; H04N 19/00884; H04N 21/438; H04N 19/00769; H04N 19/00715; H04N 13/0282; H04N 19/0032; H04N 19/00436

USPC ................................ 375/240, 240.12, 240.16
See application file for complete search history.

(56) References Cited

U.S. PATENT DOCUMENTS

| | | | |
|---|---|---|---|
| 6,057,884 A | * | 5/2000 | Chen et al. ............... 375/240.16 |
| 2006/0222079 A1 | | 10/2006 | Park et al. |

(Continued)

FOREIGN PATENT DOCUMENTS

| | | |
|---|---|---|
| WO | 2007-047736 A2 | 4/2007 |
| WO | 2008-020734 A1 | 2/2008 |

(Continued)

OTHER PUBLICATIONS

Vetro et al., "Joint Draft 6.0 on Multiview Video Coding", Joint Video Team (JVT) of ISO/IEC MPEG & ITU-T VCEG Document: JVT-Z209 (ISO/IEC JTC1/SC29/WG11 and ITU-T SG16 Q,6) Filename: JVT-Z209,doc 26th Meeting: Antalya, Turkey, Jan. 13-18, 2008.*

(Continued)

*Primary Examiner* — Sath V Perungavoor
*Assistant Examiner* — Xiaolan Xu
(74) *Attorney, Agent, or Firm* — Alston & Bird LLP

(57) ABSTRACT

Embodiments of the present invention relate to video coding for multi-view video content. It provides a coding system enabling scalability for the multi-view video content. In one embodiment, a method is provided for encoding at least two views representative of a video scene, each of the at least two views being encoded in at least two scalable layers, wherein one of the at least two scalable layers representative of one view of the at least two views is encoded with respect to a scalable layer representative of the other view of the at least two views.

12 Claims, 5 Drawing Sheets

(56) References Cited

U.S. PATENT DOCUMENTS

2008/0089428 A1 4/2008 Nakamura et al.
2010/0316122 A1 12/2010 Chen et al.

FOREIGN PATENT DOCUMENTS

WO   WO 2008051041 A1 * 5/2008
WO   WO 2009/130561 A1   10/2009
WO   WO 2010/043773 A1   4/2010

OTHER PUBLICATIONS

International Search Report and Written Opinion, received in corresponding PCT Application No. PCT/IB2009/005302, issued by National Board of Patents and Registration of Finland (ISA), Aug. 6, 2009, 13 pages.
Drose, Michael, et al., "Extending Single-View Scalable Video Coding to Multi-View Based on H264.AVC", IEEE Int. Conf. on Image Processing, Oct. 8-11, 2006, pp. 2977-2980.
Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007 http://ftp3.itu.ch/av-arch/jvt-site/2007_06_Geneva/JVT-X201.zip.
Bao et al., "CE1 report: FGS simplification," JVT-W119, 23rd JVT meeting, San Jose, USA, Apr. 2007.
Huang et al., "A robust fine granularity scalability using trellis-based predictive leak," IEEE Trans. Circuits Syst. Video Technol., vol. 12, pp. 372-385, Jun. 2002.
JVT-Z209, "Joint Draft 6.0 on Multiview Video Coding", 26th JVT meeting, Antalya, Turkey, Jan. 2008, available from http://ftp3.itu.ch/av-arch/jvt-site/2008_01_Antalya/JVT-Z209.zip.
JVT-W036 Y.-K. Wang, M.M. Hannuksela, Y. Chen, "MVC output related conformance," JVT-W036, Apr. 2007.
Chen et al., "Single-loop decoding for multiview video coding," accepted for publication in IEEE International Conference on Multimedia & Expo (ICME), Jun. 2008.
Wiegand, T., et al.; "Output Document of JVT", Joint Video Team (JVT) of ISO/IEC MPEG & ITU-T VCEG (ISO/IEC JTC1/SC29/WG11 and ITU-T SG16Q.6); 21$^{st}$ meeting; Hangzhou, China; Oct. 2006.
International Search Report and Written Opinion for International Application No. PCT/IB2011/054706, mailed Mar. 2, 2012.

* cited by examiner

METHOD AND DEVICE FOR VIDEO CODING AND DECODING

RELATED APPLICATION

This application claims priority to U.S. Application No. 61/046,770 filed Apr. 21, 2008, which is incorporated herein by reference in its entirety.

FIELD OF INVENTION

This invention relates to video coding and decoding. In particular, the present invention relates to the use of scalable video coding for each view of multi-view video coding content.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In order to facilitate communication of video content over one or more networks, several coding standards have been developed. Video coding standards include ITU-T H.261, ISO/IEC MPEG-1 Video, ITU-T H.262 or ISO/IEC MPEG-2 Video, ITU-T H.263, ISO/IEC MPEG-4 Visual, ITU-T H.264 (also know as ISO/IEC MPEG-4 AVC), and the scalable video coding (SVC) extension of H.264/AVC. In addition, there are currently efforts underway to develop new video coding standards. One such standard under development is the multi-view video coding (MVC) standard, which will become another extension to H.264/AVC.

The latest SVC Joint Draft (8.0) is described in JVT-X201, "Joint Draft 8 of SVC Amendment", 24th JVT meeting, Geneva, Switzerland, July. 2007, available from http://ftp3.itu.ch/av-arch/jvt-site/2007_06_Geneva/JVT-X201.zip.

In scalable video coding, a video signal can be encoded into a base layer and one or more enhancement layers constructed. An enhancement layer enhances the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Compressed multi-view video sequences require a considerable bitrate. They may have been coded for a spatial resolution (picture size in terms of pixels) or picture quality (spatial details) that are unnecessary for a display in use or unfeasible for a computational capacity in use while being suitable for another display and another computational complexity in use. In many systems, it would therefore be desirable to adjust the transmitted or processed bitrate, the picture rate, the picture size, or the picture quality of a compressed multi-view video bitstream. The current multi-view video coding solutions offer scalability only in terms of view scalability (selecting which views are decoded) or temporal scalability (selecting the picture rate at which the sequence is decoded.

The multi-view video profile of MPEG-2 video enables stereoscopic (2-view) video coded as if views were layers of a scalable MPEG-2 video bitstream, where a base layer is assigned to a left view and an enhancement layer is assigned to a right view. The ongoing multi-view video extension of H.264/AVC has been built on top of H.264/AVC, which provides only temporal scalability.

SUMMARY OF THE INVENTION

In one aspect, the invention relates to a method for decoding an encoded multi-view video stream comprising a plurality of coded views, wherein at least one view of the plurality of views is scalably coded with a base layer and at least one enhancement layer, the enhancement layer being one of a spatial scalability, coarse grain scalability, medium grain scalability and fine grain scalability enhancement layer. The method comprises receiving an encoded multi-view video stream; constructing a reference picture list based on marked reference pictures and inter-view only reference pictures that are not marked, both being decoded from the encoded multi-view video stream, wherein the reference pictures are marked independently for each view; and decoding the multi-view video stream using the reference picture list. In one embodiment, the constructing a reference picture list comprises appending one of an inter-view reference picture and an inter-view only reference picture to the reference picture list. The appending may include using one of a base representation and an enhancement representation of one of an inter-view reference picture and an inter-view only reference picture. In one embodiment, the appending includes using both a base representation and an enhancement representation of one of an inter-view reference picture and an inter-view only reference picture. In one embodiment, the constructing a reference picture list comprises reordering a reference picture list, wherein a picture in the initial reference picture list to be ordered is one of a base representation and an enhancement representation, a signaled indicator associated with the reference picture list reorder command determining which of the base representation and an enhancement representation is to be used. In one embodiment, the highest dependency representation for each of the plurality of views is decoded. In one embodiment, the decoding comprises forming a prediction block by a weighted average of a base representation and an enhancement representation of one of an inter-view reference picture and an inter-view only reference picture. In one embodiment, the encoded multi-view video stream is an asymmetric multi-view video stream, and the decoding comprises decoding an enhancement layer of a first view; downsampling a first resulting decoded picture from decoding the enhancement layer of the first view; and decoding a coded slice of a second view using the first resulting decoded picture for inter-view prediction reference.

In another aspect, a method for encoding a multi-view video bitstream comprises receiving data representative of two or more views in a video stream; marking reference pictures in the received data independently for each view; and encoding the data with the marked reference pictures.

In another aspect, an apparatus comprises a decoder configured to receive an encoded multi-view video stream; construct a reference picture list based on marked reference pictures and inter-view only reference pictures that are not marked, both being decoded from the encoded multi-view video stream, wherein the reference pictures are marked independently for each view; and decode the multi-view video stream using the reference picture list.

In another aspect, an apparatus comprises an encoder configured to receive data representative of two or more views; mark reference pictures in the received data independently for each view; and encode the data with the marked reference pictures.

In another aspect, an apparatus comprises a processor and a memory unit communicatively connected to the processor. The memory unit includes computer code for receiving an encoded multi-view video stream; computer code for constructing a reference picture list based on marked reference pictures and inter-view only reference pictures that are not marked, both being decoded from encoded multi-view video stream, wherein the reference pictures are marked independently for each view; and computer code for decoding the multi-view video stream using the reference picture list.

In another aspect, an apparatus comprises a processor and a memory unit communicatively connected to the processor. The memory unit includes computer code for receiving data representative of two or more views; computer code for marking reference pictures in the received data independently for each view; and computer code for encoding the data with the marked reference pictures.

In another aspect, a computer program product, embodied on a computer-readable medium, comprises a computer code for receiving an encoded multi-view video stream; a computer code for constructing a reference picture list based on marked reference pictures and inter-view only reference pictures that are not marked, both being decoded from the encoded multi-view video stream, wherein the reference pictures are marked independently for each view; and a computer code for decoding the multi-view video stream using the reference picture list.

In another aspect, a computer program product, embodied on a computer-readable medium, comprises a computer code for receiving data representative of two or more views in a video stream; a computer code for marking reference pictures in the received data independently for each view; and a computer code for encoding the data with the marked reference pictures.

In another aspect, a method for encoding a first bitstream comprises encoding a first view component based on a first picture of a first view; encoding a first scalability unit of the first view component and a second scalability unit of the first view component; predicting the second scalability unit of the first view component from the first scalability unit of the first view component; encoding a second view component based on a first picture of a second view; encoding a first scalability unit of the second view component; and predicting the first scalability unit of the second view component from the first scalability unit of the first view component. In one embodiment, the method further comprises encoding a second scalability unit of the second view component; predicting the second scalability unit of the second view component from the first scalability unit of the second view component; and predicting the second scalability unit of the second view component from the second scalability unit of the first view component. In one embodiment, a scalability unit is a dependency representation. In another embodiment, a scalability unit is a layer representation. In one embodiment, the method further comprises encoding a first indication whether or not the first scalability unit of the second view component is predicted from the first scalability unit of the first view component; and including the first indication in the first bitstream. In one embodiment, the method further comprises encoding a second indication for indicating a second bitstream comprising the first scalability unit of the first view component and the first scalability unit of the second view component, the second bitstream being decodable with the same decoding method as the first bitstream; and including the second indication in the first bitstream. In one embodiment, the first scalability unit of the first view component being of different spatial resolution than the first scalability unit of the second view component; and the second scalability unit of the first view component being of different spatial resolution than the second scalability unit of the second view component; and the method further comprises resampling the first scalability unit of the first view component in connection with predicting the first scalability unit of the second view component; and resampling the second scalability unit of the first view component in connection with predicting the second scalability unit of the second view component.

In another aspect of the invention, an apparatus comprises an encoder configured to encode a first view component based on a first picture of a first view; encode a first scalability unit of the first view component and a second scalability unit of the first view component; predict the second scalability unit of the first view component from the first scalability unit of the first view component; encode a second view component based on a first picture of a second view; encode a first scalability unit of the second view component; and predict the first scalability unit of the second view component from the first scalability unit of the first view component.

In another aspect, an apparatus comprises a processor; and a memory unit communicatively connected to the processor. The memory unit includes computer code for encoding a first view component based on a first picture of a first view; computer code for encoding a first scalability unit of the first view component and a second scalability unit of the first view component; computer code for predicting the second scalability unit of the first view component from the first scalability unit of the first view component; computer code for encoding a second view component based on a first picture of a second view; computer code for encoding a first scalability unit of the second view component; and computer code for predicting the first scalability unit of the second view component from the first scalability unit of the first view component.

In another aspect, a computer program product, embodied on a computer-readable medium, comprises a computer code for encoding a first view component based on a first picture of a first view; a computer code for encoding a first scalability unit of the first view component and a second scalability unit of the first view component; a computer code for predicting the second scalability unit of the first view component from the first scalability unit of the first view component; a computer code for encoding a second view component based on a first picture of a second view; a computer code for encoding a first scalability unit of the second view component; and a computer code for predicting the first scalability unit of the second view component from the first scalability unit of the first view component.

In another aspect of the invention, a method for decoding an encoded multi-view video stream comprises constructing a reference picture list based on marked reference pictures and inter-view only reference pictures that are not marked, wherein the reference pictures are marked independently for each of a plurality of views; and decoding a first view component based on reference pictures in the reference picture list marked for a first view and the inter-view only reference pictures that are not marked. In one embodiment, the method further comprises decoding a second view component based on reference pictures in the reference picture list marked for a second view and the inter-view only reference pictures that are not marked.

In one aspect, an apparatus comprises a decoder configured to construct a reference picture list based on marked reference pictures and inter-view only reference pictures that are not marked, wherein the reference pictures are marked independently for each of a plurality of views; and decode a first view component based on reference pictures in the reference picture list marked for a first view and the inter-view only reference pictures that are not marked.

In one aspect, an apparatus comprises a processor and a memory unit communicatively connected to the processor. The memory unit includes computer code for constructing a reference picture list based on marked reference pictures and inter-view only reference pictures that are not marked, wherein the reference pictures are marked independently for each of a plurality of views; and computer code for decoding a first view component based on reference pictures in the reference picture list marked for a first view and the inter-view only reference pictures that are not marked.

In one aspect, a computer program product, embodied on a computer-readable medium, comprises a computer code for constructing a reference picture list based on marked reference pictures and inter-view only reference pictures that are not marked, wherein the reference pictures are marked independently for each of a plurality of views; and a computer code for decoding a first view component based on reference pictures in the reference picture list marked for a first view and the inter-view only reference pictures that are not marked.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF THE VARIOUS EMBODIMENTS

Figure 1:
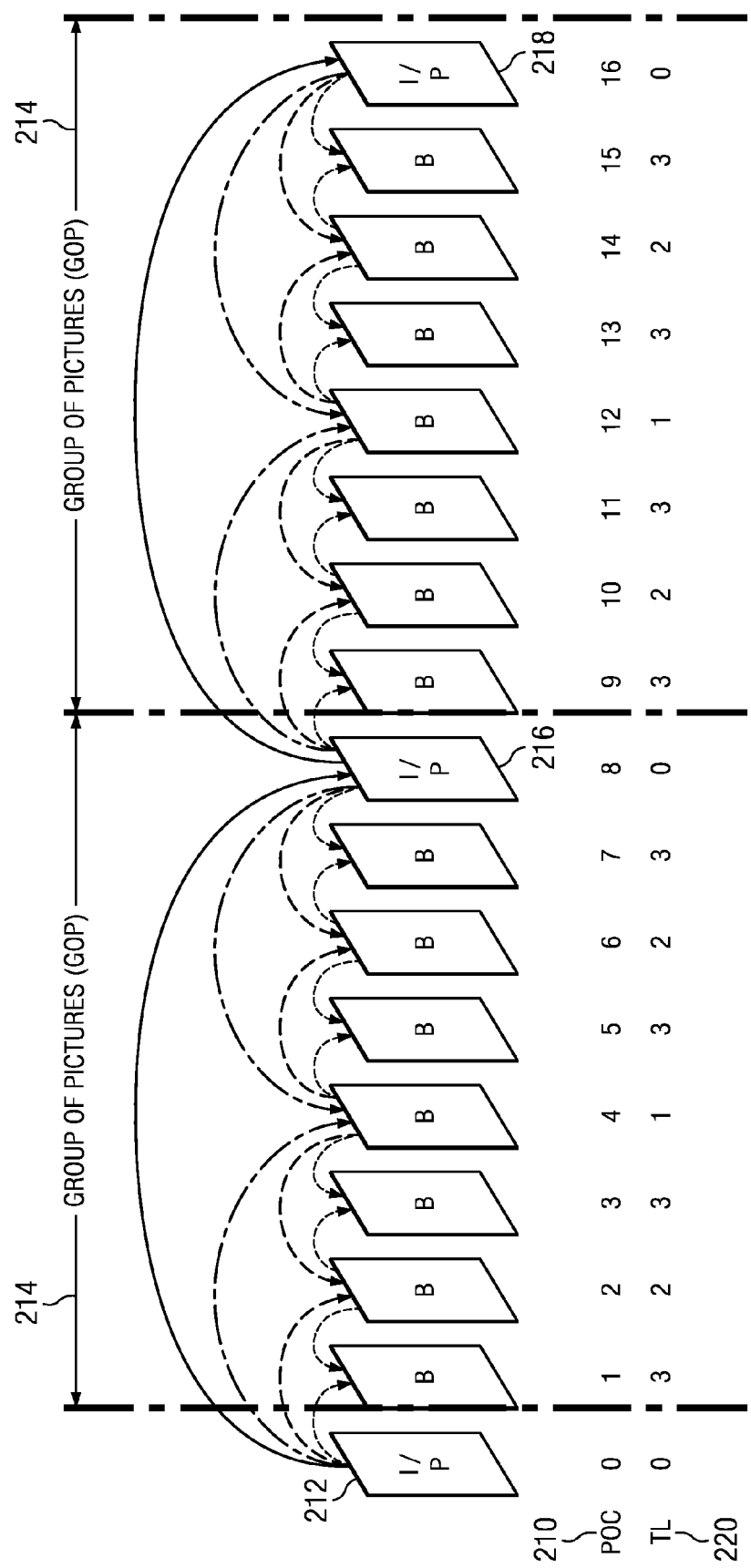
FIG. 1 illustrates an exemplary hierarchical coding structure with temporal scalability.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As noted above, in scalable video coding, a video signal can be encoded into a base layer and one or more enhancement layers constructed. An enhancement layer enhances the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). It should be mentioned that support of FGS has been dropped from the latest SVC draft, but the support is available in earlier SVC drafts, e.g., in JVT-U201, "Joint Draft 8 of SVC Amendment", 21$^{st}$ JVT meeting, Hangzhou, China, October 2006, available from http://ftp3.itu.ch/av-arch/jvt-site/2006_10_Hangzhou/JVT-U201.zip. In contrast to FGS, the scalability provided by those enhancement layers that cannot be truncated is referred to as coarse-grained (granularity) scalability (CGS). It collectively includes the traditional quality (SNR) scalability and spatial scalability. The SVC draft standard also supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_base_rep_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id." A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_base_rep_flag" is set equal to 1. An enhancement representation, also referred to as a decoded picture, results from the regular decoding process in which all the layer representations that are present for the highest dependency representation are decoded.

Each H.264/AVC VCL NAL unit (with NAL unit type in the scope of 1 to 5) is preceded by a prefix NAL unit in an SVC bitstream. A compliant H.264/AVC decoder implementation ignores prefix NAL units. The prefix NAL unit includes the "temporal_id" value and hence an SVC decoder, that decodes the base layer, can learn from the prefix NAL units the temporal scalability hierarchy. Moreover, the prefix NAL unit includes reference picture marking commands for base representations.

SVC uses the same mechanism as H.264/AVC to provide temporal scalability. Temporal scalability provides refinement of the video quality in the temporal domain, by giving flexibility of adjusting the frame rate. A review of temporal scalability is provided in the subsequent paragraphs.

The earliest scalability introduced to video coding standards was temporal scalability with B pictures in MPEG-1 Visual. In this B picture concept, a B picture is bi-predicted from two pictures, one preceding the B picture and the other succeeding the B picture, both in display order. In bi-prediction, two prediction blocks from two reference pictures are averaged sample-wise to get the final prediction block. Conventionally, a B picture is a non-reference picture (i.e., it is not used for inter-picture prediction reference by other pictures). Consequently, the B pictures could be discarded to achieve a temporal scalability point with a lower frame rate. The same mechanism was retained in MPEG-2 Video, H.263 and MPEG-4 Visual.

In H.264/AVC, the concept of B pictures or B slices has been changed. The definition of B slice is as follows: A slice that may be decoded using intra prediction from decoded samples within the same slice or inter prediction from previously-decoded reference pictures, using at most two motion vectors and reference indices to predict the sample values of each block. Both the bi-directional prediction property and the non-reference picture property of the conventional B picture concept are no longer valid. A block in a B slice may be predicted from two reference pictures in the same direction in display order, and a picture consisting of B slices may be referred by other pictures for inter-picture prediction.

In H.264/AVC, SVC and MVC, temporal scalability can be achieved by using non-reference pictures and/or hierarchical inter-picture prediction structure. Using only non-reference pictures is able to achieve similar temporal scalability as using conventional B pictures in MPEG-1/2/4, by discarding non-reference pictures. Hierarchical coding structure can achieve more flexible temporal scalability.

Referring now to FIG. 1, an exemplary hierarchical coding structure is illustrated with four levels of temporal scalability. The display order is indicated by the values denoted as picture order count (POC) 210. The I or P pictures, such as I/P picture 212, also referred to as key pictures, are coded as the first picture of a group of pictures (GOPs) 214 in decoding order. When a key picture (e.g., key picture 216, 218) is inter-coded, the previous key pictures 212, 216 are used as reference for inter-picture prediction. These pictures correspond to the lowest temporal level 220 (denoted as TL in the figure) in the temporal scalable structure and are associated with the lowest frame rate. Pictures of a higher temporal level may only use pictures of the same or lower temporal level for inter-picture prediction. With such a hierarchical coding structure, different temporal scalability corresponding to different frame rates can be achieved by discarding pictures of a certain temporal level value and beyond. In FIG. 1, the pictures 0, 8 and 16 are of the lowest temporal level, while the pictures 1, 3, 5, 7, 9, 11, 13 and 15 are of the highest temporal level. Other pictures are assigned with other temporal level hierarchically. These pictures of different temporal levels compose the bitstream of different frame rate. When decoding all the temporal levels, a frame rate of 30 Hz is obtained. Other frame rates can be obtained by discarding pictures of some temporal levels. The pictures of the lowest temporal level are associated with the frame rate of 3.25 Hz. A temporal scalable layer with a lower temporal level or a lower frame rate is also called as a lower temporal layer.

The above-described hierarchical B picture coding structure is the most typical coding structure for temporal scalability. However, it is noted that much more flexible coding structures are possible. For example, the GOP size may not be constant over time. In another example, the temporal enhancement layer pictures do not have to be coded as B slices; they may also be coded as P slices.

In H.264/AVC, the temporal level may be signaled by the sub-sequence layer number in the sub-sequence information Supplemental Enhancement Information (SEI) messages. In SVC, the temporal level is signaled in the Network Abstraction Layer (NAL) unit header by the syntax element "temporal_id." The bitrate and frame rate information for each temporal level is signaled in the scalability information SEI message.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this causes encoding-decoding mismatch, also referred to as drift, when some FGS data are discarded.

One important feature of SVC is that the FGS NAL units can be freely dropped or truncated, and MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_base_prediction_flag." When the value of this element is equal to 1, decoding of the NAL unit uses the base representations of the reference pictures during the inter prediction process. The syntax element "store_base_rep_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

The leaky prediction technique makes use of both base representations and decoded pictures (corresponding to the highest decoded "quality_id"), by predicting FGS data using a weighted combination of the base representations and decoded pictures. The weighting factor can be used to control the attenuation of the potential drift in the enhancement layer pictures. More information on leaky prediction can be found in H. C. Huang, C. N. Wang, and T. Chiang, "A robust fine granularity scalability using trellis-based predictive leak," IEEE Trans. Circuits Syst. Video Technol., vol. 12, pp. 372-385, June 2002.

When leaky prediction is used, the FGS feature of the SVC is often referred to as Adaptive Reference FGS (AR-FGS). AR-FGS is a tool to balance between coding efficiency and drift control. AR-FGS enables leaky prediction by slice level signaling and MB level adaptation of weighting factors. More details of a mature version of AR-FGS can be found in JVT-W119: Yiliang Bao, Marta Karczewicz, Yan Ye "CEI report: FGS simplification," JVT-W119, $23^{rd}$ JVT meeting, San Jose, USA, April 2007, available at ftp3.itu.ch/av-arch/jvt-site/2007_04_SanJose/JVT-W119.zip.

A value of picture order count (POC) is derived for each picture and is non-decreasing with increasing picture position in output order relative to the previous IDR picture or a picture containing a memory management control operation marking all pictures as "unused for reference." POC therefore indicates the output order of pictures. POC is also used in the decoding process for implicit scaling of motion vectors in the temporal direct mode of bi-predictive slices, for implicitly derived weights in weighted prediction, and for reference picture list initialization of B slices. Furthermore, POC is used in verification of output order conformance.

Values of POC can be coded with one of the three modes signaled in the active sequence parameter set. In the first mode, the selected number of least significant bits of the POC value is included in each slice header. It may be beneficial to use the first mode when the decoding and output order of pictures differs and the picture rate varies. In the second mode, the relative increments of POC as a function of the picture position in decoding order in the coded video sequence are coded in the sequence parameter set. In addition, deviations from the POC value derived from the sequence parameter set may be indicated in slice headers. The second mode suits bitstreams in which the decoding and output order of pictures differs and the picture rate stays exactly or close to unchanged. In the third mode, the value of POC is derived from the decoding order by assuming that the decoding and output order are identical. In addition, only one non-reference picture can occur consecutively, when the third mode is used.

The reference picture lists construction in AVC can be described as follows. When multiple reference pictures can be used, each reference picture must be identified. In AVC, the identification of a reference picture used for a coded block is as follows. First, all of the reference pictures stored in the DPB for prediction reference of future pictures is either marked as "used for short-term reference" (referred to as short-term pictures) or "used for long-term reference" (referred to as long-term pictures). When decoding a coded slice, a reference picture list is constructed. If the coded slice is a bi-predicted slice, a second reference picture list is also constructed. A reference picture used for a coded block is then identified by the index of the used reference picture in the reference picture list. The index is coded in the bitstream when more than one reference picture may be used.

The reference picture list construction process is as follows. For simplicity, it is assumed herein that only one reference picture list is needed. First, an initial reference picture list is constructed including all of the short-term and long-term reference pictures. Reference picture list reordering (RPLR) is then performed when the slice header contains RPLR commands. The PRLR process may reorder the reference pictures into a different order than the order in the initial list. Both the initial list and the final list, after reordering, contains only a certain number of entries indicated by a syntax element in the slice header or the picture parameter set referred by the slice.

During the initialization process, all of the short-term and long-term pictures are considered as candidates of reference picture lists for the current picture. No matter current picture is B or P picture, and long-term pictures are placed after the short-term pictures in RefPicList0 (and RefPicList1 available for B slices). For P pictures, the initial reference picture list for RefPicList0 contains all short-term reference pictures ordered in descending order of PicNum.

For B pictures, those reference pictures obtained from all short term pictures are ordered by a rule related to current POC number and the POC number of the reference picture. For RefPicList0, reference pictures with smaller POC (comparing to current POC) are considered first and inserted into the RefPictList0 with the descending order of POC. Pictures with larger POC are then appended with the ascending order of POC. For RefPicList1 (if available), reference pictures with larger POC (comparing to current POC) are considered first and inserted into the RefPicList1 with the ascending order of POC. Pictures with smaller POC are then appended with descending order of POC. After considering all of the short-term reference pictures, the long-term reference pictures are appended by the ascending order of LongTermPicNum, both for P and B pictures.

The reordering process is invoked by continuous RPLR commands, including four type of commands: (1) A command to specify a short-term picture with smaller PicNum (comparing to a temporally predicted PicNum) to be moved; (2) a command to specify a short-term picture with larger PicNum to be moved; (3) a command to specify a long-term picture with a certain LongTermPicNum to be moved and (4) a command to specify the end of the RPLR loop. If a current picture is bi-predicted, there are two loops—one for the forward reference list and one for the backward reference list.

The predicted PicNum referred to as picNumLXPred is initialized as the PicNum of the current coded picture and is set to the PicNum of the just moved picture after each reordering process for a short-term picture. The difference between the PicNum of a current picture being reordered and picNumLXPred is signaled in the RPLR command. The picture indicated to be reordered is moved to the beginning of the reference picture list. After the reordering process is complete, a whole reference picture list is truncated based on the active reference picture list size, which is num_ref_idx_1X_active_minus1+1 (X equal to 0 or 1 corresponds for RefPicList0 and RefPicList1 respectively).

In SVC, a reference picture list consists of either only base representations (when "use_base_prediction_flag" is equal to 1) or only decoded pictures not marked as "base representation" (when "use_base_prediction_flag" is equal to 0), but never both at the same time.

In terms of reference picture marking, decoded pictures used for predicting subsequent coded pictures and for future output are buffered in the decoded picture buffer (DPB). To efficiently utilize the buffer memory, the DPB management processes, including the storage process of decoded pictures into the DPB, the marking process of reference pictures, output and removal processes of decoded pictures from the DPB, are specified.

The process for reference picture marking in AVC is summarized as follows. The maximum number of reference pictures used for inter prediction, referred to as M, is indicated in the active sequence parameter set. When a reference picture is decoded, it is marked as "used for reference." If the decoding of the reference picture causes more than M pictures to be marked as "used for reference," at least one picture must be marked as "unused for reference." The DPB removal process then removes pictures marked as "unused for reference" from the DPB if they are not needed for output as well.

There are two types of operation for the reference picture marking: adaptive memory control and sliding window. The operation mode for reference picture marking is selected on a picture basis. The adaptive memory control requires the presence of memory management control operation (MMCO) commands in the bitstream. The memory management control operations enable explicit signaling which pictures are marked as "unused for reference," assigning long-term frame indices to short-term reference pictures, storage of the current picture as long-term picture, changing a short-term picture to the long-term picture, and assigning the maximum allowed long-term frame index (MaxLongTermFrameIdx) for long-term pictures. If the sliding window operation mode is in use and there are M pictures marked as "used for reference," then the short-term reference picture that was first decoded picture among those short-term reference pictures that are marked as "used for reference" is marked as "unused for reference." In other words, the sliding window operation mode results in first-in-first-out buffering operation among short-term reference pictures.

Each short-term picture is associated with a variable PicNum that is derived from the syntax element "frame_num," and each long-term picture is associated with a variable LongTermPicNum that is derived form the "long_term_frame_idx" which is signaled by MMCO command.

PicNum is derived from FrameNumWrap depending on whether frame or field is coded or decoded. For frames where PicNum equal to FrameNumWrap. FrameNumWrap is derived from FrameNum, and FrameNum is derived from frame_num. For example, in AVC frame coding, FrameNum is assigned the same as frame_num and FrameNumWrap is defined as below:

```
if( FrameNum > frame_num )
    FrameNumWrap = FrameNum − MaxFrameNum
else
    FrameNumWrap = FrameNum
```

LongTermPicNum is derived from the long-term frame index (LongTermFrameIdx) assigned for the picture. For frames, LongTermPicNum is equal to LongTermFrameIdx.

"frame_num" is a syntax element in each slice header. The value of "frame_num" for a frame or a complementary field pair essentially increments by one, in modulo arithmetic, relative to the "frame_num" of the previous reference frame or reference complementary field pair. In IDR pictures, the value of "frame_num" is zero. For pictures containing a memory management control operation marking all pictures as "unused for reference," the value of "frame_num" is considered to be zero after the decoding of the picture.

The MMCO commands use PicNum and LongTermPicNum for indicating the target picture for the command as follows. (1) To mark a short-term picture as "unused for reference," the PicNum difference between current picture p and the destination picture r is to be signaled in the MMCO command. (2) To mark a long-term picture as "unused for reference," the LongTermPicNum of the to-be-removed picture r is to be signaled in the MMCO command. (3) To store the current picture p as a long-term picture, a "long_term_frame_idx" is to be signaled with the MMCO command. This index is assigned to the newly stored long-term picture as the value of LongTermPicNum. (4) To change a picture r from short-term picture to long-term picture, a PicNum difference between current picture p and picture r is signaled in the MMCO command and the "long_term_frame_idx" is signaled in the MMCO command. The index is also assigned to the this long-term picture.

In addition to the above reference picture marking concepts from AVC, the marking in SVC is supported as follows. The marking of a base representation as "used for reference" is always the same as the corresponding decoded picture. There is therefore no additional syntax elements for marking base presentations as "used for reference." However, marking base representations as "unused for reference" makes use of separate MMCO commands, the syntax of which is not present in AVC, to enable optimal memory usage.

The hypothetical reference decoder (HRD), specified in Annex C of H.264/AVC, is used to check bitstream and decoder conformances. The HRD contains a coded picture buffer (CPB), an instantaneous decoding process, a decoded picture buffer (DPB), and an output picture cropping block. The CPB and the instantaneous decoding process are specified similarly to any other video coding standard, and the output picture cropping block simply crops those samples from the decoded picture that are outside the signaled output picture extents. The DPB was introduced in H.264/AVC in order to control the required memory resources for decoding of conformant bitstreams. The DPB includes a unified decoded picture buffering process for reference pictures and output reordering. A decoded picture is removed from the DPB when it is no longer used as reference and not needed for output. A picture is not needed for output when either one of the two following conditions are fulfilled: the picture was already output or the picture was marked as not intended for output with the "output_flag" that is present in the NAL unit header of SVC NAL units. The maximum size of the DPB that bitstreams are allowed to use is specified in the Level definitions (Annex A) of H.264/AVC.

There are two types of conformance for decoders: output timing conformance and output order conformance. For output timing conformance, a decoder must output pictures at identical times compared to the HRD. For output order conformance, only the correct order of output picture is taken into account. The output order DPB is assumed to contain a maximum allowed number of frame buffers. A frame is removed from the DPB when it is no longer used as reference and needed for output. When the DPB becomes full, the earliest frame in output order is output until at least one frame buffer becomes unoccupied.

In multi-view video coding, video sequences output from different cameras, each corresponding to different views, are encoded into one bit-stream. After decoding, to display a certain view, the decoded pictures belong to that view are reconstructed and displayed. It is also possible that more than one view is reconstructed and displayed.

Multi-view video coding has a wide variety of applications, including free-viewpoint video/television, 3D TV and surveillance. Currently, the Joint Video Team (JVT) of ISO/IEC Motion Picture Expert Group (MPEG) and ITU-T Video Coding Expert Group is working to develop a MVC standard, which is becoming an extension of H.264/AVC. Hereafter, we refer to these two (draft) standards as MVC and AVC, respectively.

The latest joint draft of MVC is in described in JVT-Z209, "Joint Draft 6.0 on Multiview Video Coding", 26$^{th}$ JVT meeting, Antalya, Turkey, January 2008, available from http://ftp3.itu.ch/av-arch/jvt-site/2008_01_Antalya/JVT-Z209.zip.

Figure 2:
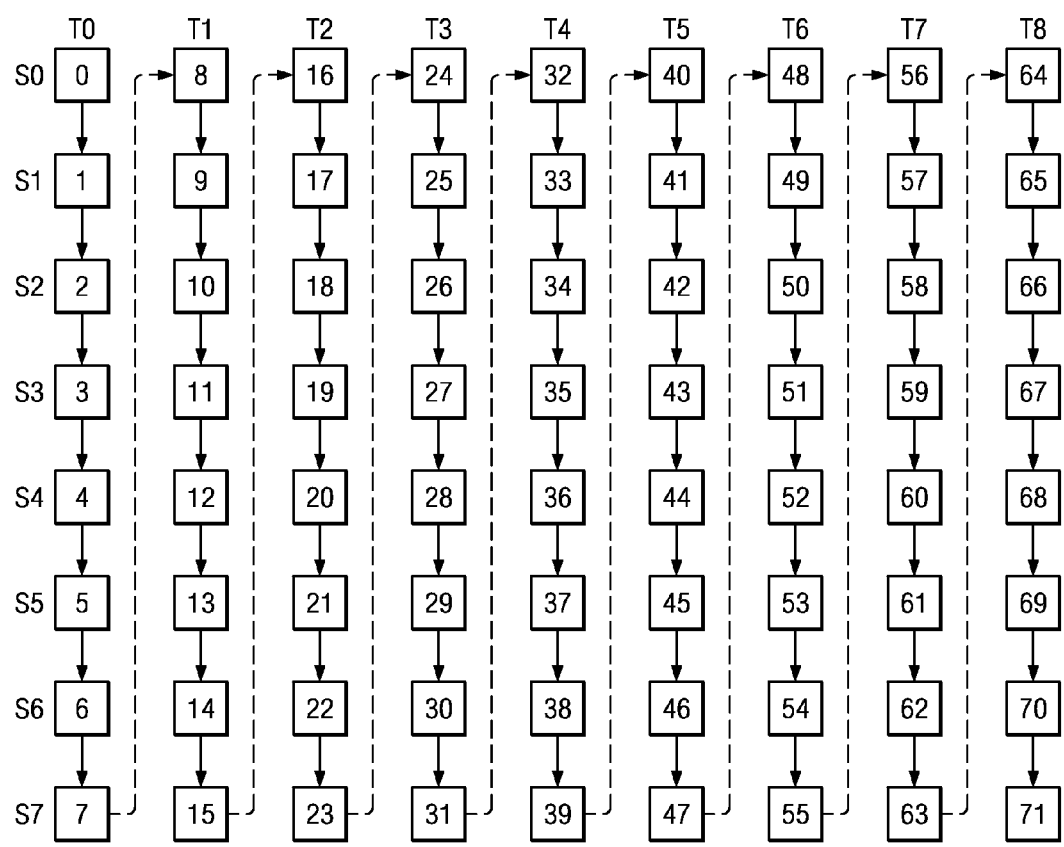
FIG. 2 illustrates an exemplary MVC decoding order.

Referring now to FIG. 2, an exemplary MVC decoding order (i.e. bitstream order) is illustrated. The decoding order arrangement is referred as time-first coding. Each access unit is defined to contain the coded pictures of all the views for one output time instance. Note that the decoding order of access units may not be identical to the output or display order.

Figure 3:
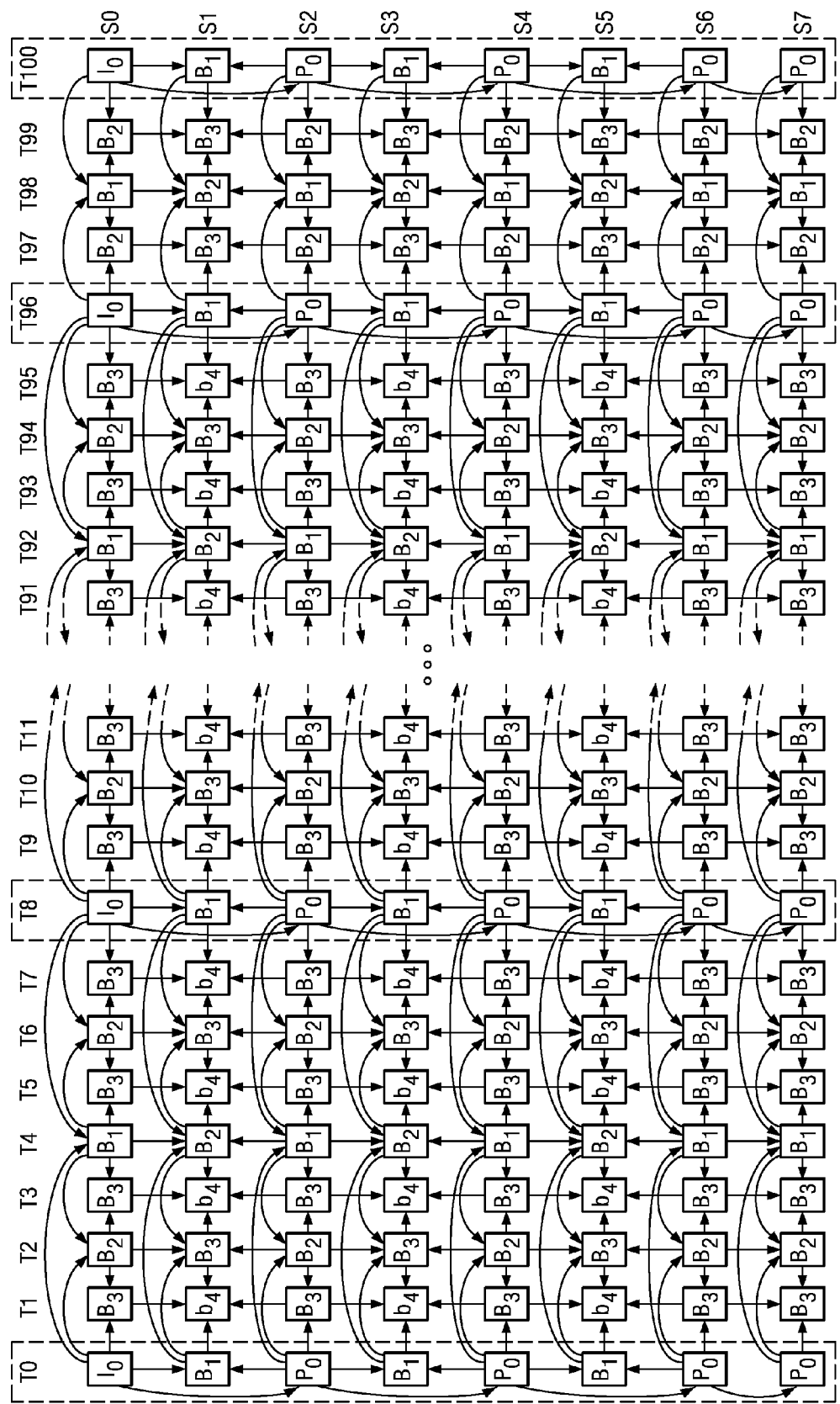
FIG. 3 illustrates an exemplary MVC prediction structure for multi-view video coding.

Referring now to FIG. 3, an exemplary MVC prediction (including both inter-picture prediction within each view and inter-view prediction) structure for multi-view video coding is illustrated. In the illustrated structure, predictions are indicated by arrows, the pointed-to object using the point-from object for prediction reference.

An anchor picture is a coded picture in which all slices reference only slices with the same temporal index, i.e., only slices in other views and not slices in earlier pictures of the current view. An anchor picture is signaled by setting the "anchor_pic_flag" to 1. After decoding the anchor picture, all following coded pictures in display order shall be able to be decoded without inter-prediction from any picture decoded prior to the anchor picture. If a picture in one view is an anchor picture, then all pictures with the same temporal index in other views shall also be anchor pictures. Consequently, decoding of any view can be started from a temporal index that corresponds to anchor pictures. Pictures with "anchor_pic_flag" equal to 0 are named non-anchor pictures.

In MVC Joint Draft (JD) 6.0, view dependencies are specified in the sequence parameter set (SPS) MVC extension. The dependencies for anchor pictures and non-anchor pictures are independently specified. Therefore anchor pictures and non-anchor pictures can have different view dependencies. However, for the set of pictures that refer to the same SPS, all the anchor pictures must have the same view dependency, and all the non-anchor pictures must have the same view dependency. In the SPS MVC extension, dependent views can be signaled separately for the views used as reference pictures in RefPicList0 and RefPicList1.

In JD 6.0, there is an "inter-view-flag" in the network abstraction layer (NAL) unit header which indicates whether the current picture is used for inter-view prediction for the pictures in other views.

In JD 6.0, inter-view prediction is supported by only texture prediction (i.e., only the reconstructed sample values may be used for inter-view prediction), and only the reconstructed pictures of the same output time instance as the current picture are used for inter-view prediction. The fact that reconstructed sample values are used in inter-view prediction also implies that MVC utilizes multi-loop decoding. In other words, motion compensation and decoded picture reconstruction are performed for each view.

The process of constructing reference picture lists in MVC is summarized as follows.

First, a reference picture list is constructed including all the short-term and long-term reference pictures that are marked as "used for reference" and belong to the same view as the current slice. Those short-term and long-term reference pictures are named intra-view references for simplicity. Then, inter-view reference pictures and inter-view only reference pictures are appended after the intra-view references, according to the SPS and the "inter_view_flag," to form an initial list. Reference picture list reordering (RPLR) is then performed when the slice header contains RPLR commands. The RPLR process may reorder the intra-view reference pictures, inter-view reference pictures and inter-view only reference pictures into a different order than the order in the initial list. Both the initial list and final list after reordering must contain only a certain number of entries indicated by a syntax element in the slice header or the picture parameter set referred by the slice.

Reference picture marking is performed identically to H.264/AVC for each view independently as if other views were not present in the bitstream.

The DPB operation is similar to that of H.264/AVC except for the following. Non-reference pictures (with "nal_ref_idc" equal to 0) that are used as for inter-view prediction reference are called inter-view only reference pictures, and the term "inter-view reference pictures" only refer to those pictures with "nal_ref_idc" greater than 0 and are used for inter-view prediction reference. In some draft versions of MVC, they have been stored in the DPB and implicitly removed from the DPB when they are no longer needed for output and inter-view reference.

In MVC Joint Draft (JD) 6.0, after the first byte of NAL (Network Abstraction Layer) unit, an NALU unit header extension (3 bytes) is followed. The NAL unit header extension includes the syntax elements that describe the properties of the NAL unit in the context of MVC.

Many display arrangements for multi-view video are based on rendering of a different image to viewer's left and right eyes. For example, when data glasses or auto-stereoscopic displays are used, only two views are observed at a time in typical MVC applications, such as 3D TV, although the scene can often be viewed from different positions or angles. Based on the concept of asymmetric coding, one view in a stereoscopic pair can be coded with lower fidelity, while the perceptual quality degradation can be negligible. Thus, stereoscopic video applications may be feasible with moderately increased complexity and bandwidth requirement compared to mono-view applications, even in the mobile application domain.

As backward compatibility is important in practice, a so-called asymmetric stereoscopic video (ASV) codec can encode the base view (view 0) as H.264/AVC compliant and the other view (view 1) with techniques specified in H.264/AVC as well as inter-view prediction methods. Approaches have been proposed to realize an ASV codec by invoking a downsampling process before inter-view prediction.

However, it is desirable to design the coding of low-resolution view in a manner with low computational complexity and high compression efficiency. A low-complexity motion compensation (MC) scheme has been proposed to substantially reduce the complexity of asymmetric MVC without compression efficiency loss. Direct motion compensation without a downsampling process from the high-resolution inter-view picture to the low resolution picture was proposed in Y. Chen, Y.-K. Wang, M. M. Hannuksela, and M. Gabbouj, "Single-loop decoding for multiview video coding," accepted for publication in IEEE International Conference on Multimedia & Expo (ICME), June 2008.

As noted above, compressed multi-view video sequences require a considerable bitrate. They may have been coded for a spatial resolution (picture size in terms of pixels) or picture quality (spatial details) that are unnecessary for a display in use or unfeasible for a computational capacity in use while being suitable for another display and another computational complexity in use. In many systems, it would therefore be desirable to adjust the transmitted or processed bitrate, the picture rate, the picture size, or the picture quality of a compressed multi-view video bitstream. The current multi-view video coding solutions offer scalability only in terms of view scalability (selecting which views are decoded) or temporal scalability (selecting the picture rate at which the sequence is decoded).

Realizing a multi-view video coding scheme where each view is coded with a scalable video codec is non-trivial. Scalable adaptation of individual views cannot be done without causing a prediction drift in inter-view prediction.

For example, when spatial scalability is applied and inter-view prediction is applied from a spatial enhancement layer of a view, removal of the spatial scalable enhancement layer would cause inter-view prediction from the view containing the spatial scalable enhancement layer to fail, as the reference picture used for inter-view prediction can be of a different spatial resolution or, in case of extended spatial scalability, cover a different region of the original uncompressed picture.

In another example, when coarse granular scalability (CGS) or medium grain scalability (MGS) is applied, removal of a CGS or MGS enhancement layer would cause a prediction drift in inter-view prediction from the view containing the CGS or MGS enhancement layer, as different decoded pictures would be used as prediction in the decoder and in the encoder. The decoder would use a decoded picture resulting from the bitstream where the CGS or MGS enhancement layer is not present, whereas the encoder used a decoded picture resulting from the bitstream where the CGS or MGS enhancement layer was present.

In accordance with embodiments of the present invention, a multi-view video coding scheme is provided where at least one view is coded with a scalable video coding scheme. In one particular embodiment, a multi-view video coding extension of the Scalable Video Coding (SVC) standard is provided.

Embodiments of the present invention provide a codec design that enables any view in a multi-view bitstream to be coded in a scalable fashion. In one embodiment, a reference picture marking design and a reference picture list construction design are provided to enable the use of any dependency representation from any other view earlier in view order than the current view for inter-view prediction.

For the dependency representation used for inter-view prediction, the reference picture marking design and reference picture list construction design in accordance with embodiments of the present invention allow for selective use of base representation or enhancement representation of the dependency representation for inter-view prediction. The enhancement representation of a dependency representation may result from decoding of a MGS layer representation or a FGS layer representation An exemplary codec in accordance with embodiments of the present invention is described below. All the processes that are specified in SVC and MVC JD 6.0 apply as such or are modified in the description of the exemplary codec below. In the description of the exemplary coded, it is assumed that the "profile_idc" is equal to 118.

NAL Unit Header

The NAL unit syntax (i.e., nal_unit( )), is as specified in MVC JD 6.0. The syntax and semantics of the proposed NAL unit header are as follows. The first byte of the NAL unit header consists of forbidden_zero_bit (1 bit), nal_ref_idc (2 bits), and nal_unit_type (5 bits), same as in H.264/AVC, SVC, and MVC JD 6.0. The rest of the bytes of the NAL unit header are contained in the syntax structure nal_unit_header_svc_mvc_extension( ), defined as follows:

| nal_unit_header_svc_mvc_extension( ) { | C | Descriptor |
|---|---|---|
| svc_mvc_flag | All | u(1) |
| idr_flag | All | u(1) |
| priority_id | All | u(6) |
| no_inter_layer_pred_flag | All | u(1) |
| dependency_id | All | u(3) |
| quality_id | All | u(4) |
| temporal_id | All | u(3) |
| use_base_prediction_flag | All | u(1) |
| discardable_flag | All | u(1) |
| output_flag | All | u(1) |
| reserved_three_2bits | All | u(2) |
| anchor_pic_flag | All | u(1) |
| view_id | All | u(10) |
| inter_view_flag | All | u(1) |
| inter_view_ubp_flag | All | u(1) |
| reserved_seven_3bits | All | u(3) |
| } | | |

The semantics of forbidden_zero_bit, nal_ref_idc and nal_unit_type are as specified in SVC, with the following additions.

NAL units with "nal_unit_type" equal to 1 to 5 shall only be used for the base view as specified in MVC JD 6.0. Within the base view, the use of NAL units with "nal_unit_type" equal to 1 to 5 is as specified in SVC. Prefix NAL units shall only appear in the base layer in the base view. The base layer in the base view is as specified in SVC. For non-base views, coded slice NAL units with "dependency_id" equal to 0 and "quality_id" equal to 0 shall have "nal_unit_type" equal to 20, and prefix NAL units shall not be present.

When the current NAL unit is a prefix NAL unit with "nal_unit_type" equal to 14 and "svc_mvc_flag" equal to 1, all the syntax elements in "nal_unit_header_svc_mvc_extension( )" also apply to the NAL unit that directly succeeds the prefix NAL unit in decoding order. An NAL unit that directly succeeds a prefix NAL unit is considered to contain these syntax elements with values identical to that of the prefix NAL unit.

"svc_mvc_flag" equal to 1 specifies that the current NAL unit is used for MVC, for which any view may be coded with spatial and/or quality scalability. "svc_mvc_flag" equal to 0 indicates that the current NAL unit is used for SVC. The following semantics apply when "svc_mvc_flag" is equal to 1.

"idr_flag" equal to 1 specifies that the current access unit is an IDR access unit when all the view components in the current access unit are IDR view components. A view component consists of all the NAL units in one access unit having identical "view_id." An IDR view component refers to a view component for which the dependency representation with the greatest value of "dependency_id" among all the dependency representations within the view component has "idr_flag" equal to 1 or "nal_unit_type" equal to 5.

The semantics of "priority_id" are as specified in MVC JD 6.0.

The semantics of "no_inter_layer_pred_flag" are as specified in SVC.

"dependency_id" specifies a dependency identifier for the NAL unit. "dependency_id" shall be equal to 0 in VCL prefix NAL units. NAL units having the same value of "dependency_id" within one view comprise a dependency representation. Within a bitstream, a dependency representation is identified by a pair of "view_id" and "dependency_id" values.

The semantics of "quality_id" is as specified in SVC, with the following applies in addition. NAL units having the same value of "quality_id" within one dependency representation comprise a layer representation. Within a bitstream, a layer representation is identified by a set of "view_id," "dependency_id" and "quality_id" values.

The semantics of temporal_id are as specified in MVC JD 6.0.

"use_ref_base_pic_flag" equal to 1 specifies that reference base pictures (also referenced to as base representations) are used as reference pictures for the inter prediction process. "use_ref_base_pic_flag" equal to 0 specifies that decoded pictures (also referred to as enhancement representations) are used as reference pictures during the inter prediction process. The values of "use_ref_base_pic_flag" shall be the same for all NAL units of a dependency representation. "use_ref_base_pic_flag" shall be equal to 0 in filler prefix NAL units.

"discardable_flag" equal to 1 specifies that the current NAL unit is not used for decoding NAL units of the current view component and all subsequent view components of the same view that have a greater value of "dependency_id" than the current NAL unit. "discardable_flag" equal to 0 specifies that the current NAL unit may be used for decoding NAL units of the current view component and all subsequent view components of the same view that have a greater value of "dependency_id" than the current NAL unit. "discardable_flag" shall be equal to 1 in filler prefix NAL units.

The semantics of "output_flag" and "reserved_three_2 bits" are as specified in SVC.

"anchor_picture_flag" equal to 1 specifies that the current view component is an anchor picture as specified in MVC JD 6.0 when the value of "dependency_id" for the NAL unit is equal to the maximum value of "dependency_id" for the view component. "anchor_picture_flag" shall be identical for all NAL units within a dependency representation.

The semantics of "view_id" are as specified in MVC JD 6.0.

"inter_view_flag" equal to 0 specifies that the current dependency representation is not used for inter-view prediction. "inter_view_flag" equal to 1 specifies that the current dependency representation is used for inter-view prediction.

"inter_view_ubp_flag" equal to 1 specifies that the current dependency representation uses base representations for inter-view prediction. "inter_view_ubp_flag" equal to 0 specifies that the current dependency representation does not use base representations for inter-view prediction.

The values of "inter_view_ubp_flag" shall be the same for all NAL units of a dependency representation.

"reserved_seven_3 bits" shall be equal to 7. Decoders shall ignore the value of "reserved_seven_3 bits."

Sequence Parameter Set and Subset Sequence Parameter Set

The syntax and semantics for sequence parameter set RBSP are as apecified in MVC JD 6.0. The syntax for subset sequence parameter set RBSP is as follows.

| subset_seq_parameter_set_rbsp( ) { | C | Descriptor |
|---|---|---|
| seq_parameter_set_data( ) | 0 | |
| if( profile_idc == 83 \| \| profile_idc == 86 \| \| profile_idc == 118 ) { | | |
| seq_parameter_set_svc_extension( ) | 0 | |
| svc_vui_parameters_present_flag | 0 | u(1) |
| if( svc_vui_parameters_present_flag == 1 ) | | |
| svc_vui_parameters_extension( ) | 0 | |
| } | | |

-continued

| subset_seq_parameter_set_rbsp( ) { | C | Descriptor |
|---|---|---|
|     reserved_mvc_extension_one_bit | 0 | u(1) |
|     if( profile_idc == 118 ) { | | |
|         seq_parameter_set_mvc_extension( ) | 0 | |
|     } | | |
|     additional_extension2_flag | 0 | u(1) |
|     if( additional_extension2_flag == 1 ) | | |
|         while( more_rbsp_data( ) ) | | |
|             additional_extension2_data_flag | 0 | u(1) |
|     rbsp_trailing_bits( ) | | |
| } | | |

The semantics for all syntax elements in the syntax structure seq_parameter_set_svc_extension( ) as specified in SVC apply for each view independently.

"reserved_mvc_extension_one_bit" shall be equal to 1. The semantics for all syntax elements in the syntax structure "seq_parameter_set_mvc_extension( )" as specified in MVC JD 6.0 apply.

Prefix NAL Unit

The prefix NAL unit RBSP syntax, "prefix_nal_unit_rbsp( )," and the semantics of the fields therein are as specified in SVC.

Slice

The syntax and semantics of the RBSP with NAL unit type equal to 20 (i.e., slice layer in scalable extension RBSP) are as specified in SVC.

Reference Picture Marking

Reference picture marking as specified in SVC applies independently for each view. Note that inter-view only reference pictures (with "nal_ref_idc" equal to 0 and "inter_view_flag" equal to 1) are not marked by the reference picture marking process.

Reference Picture List Construction

In one embodiment, the reference picture lists construction process is described as follows. A variable biPred is derived as follows:

If the current slice currSlice is a B or EB slice, biPred is set equal to 1;

Otherwise, biPred is set equal to 0.

A reference picture list initialization process is invoked as specified in subclause G.8.2.3 of SVC (excluding the reordering process for reference picture lists). After that, an appending process for inter-view reference pictures and inter-view only reference pictures as specified in subclause H.8.2.1 of MVC is invoked with the following modification. During the invocation of the appending process, if the current slice has "inter_view_ubp_flag" equal to 1, then only base representations (i.e. reference base pictures) stored in the decoded picture buffer are considered; Otherwise only the decoded pictures (i.e. enhancement representations) are considered.

The initial reference picture lists RefPicList0 and, when biPred is equal to 1, RefPicList1 are modified by invoking the reordering process for reference picture lists as specified in subclause H.8.2.2.2 of MVC. During the reordering process in subclause H.8.2.2.2, if a view component which is not belonging to the current view is targeted for reordering, when "inter_view_ubp_flag" is equal to 1 for the current slice, the decoded base picture (i.e. the base representation) of that view component is used, otherwise, the decoded picture (i.e. the enhancement representation) of that view component is used.

In accordance with a second embodiment, the reference picture lists construction process is described as follows. Note that this embodiment can use the base representation of one inter-view reference picture or inter-view only reference picture and the enhancement representation of another inter-view reference picture or inter-view only reference picture for coding of one slice. Extra syntax elements are added in the reference picture list reordering syntax table.

| ref_pic_list_reordering( ) { | C | Descriptor |
|---|---|---|
|   if( slice_type != I && slice_type != ) { | | |
|     ref_pic_list_reordering_flag_l0 | 2 | u(1) |
|     if( ref_pic_list_reordering_flag_l0 ) | | |
|       do { | | |
|         reordering_of_pic_nums_idc | 2 | ue(v) |
|         if( reordering_of_pic_nums_idc == 0 \|\| | | |
|           reordering_of_pic_nums_idc == 1 ) | | |
|           abs_diff_pic_num_minus1 | 2 | ue(v) |
|         else if( reordering_of_pic_nums_idc == 2 ) | | |
|           long_term_pic_num | 2 | ue(v) |
|         else if ( reordering_of_pic_nums_idc == 4 \|\| | | |
|           reordering_of_pic_nums_idc == 5) | | |
|           abs_diff_view_idx_minus1 | 2 | ue(v) |
|           use_inter_view_base_flag | 2 | u(1) |
|       } while( reordering_of_pic_nums_idc != 3 ) | | |
|   } | | |
|   if( slice_type == B \|\| slice_type == EB ) { | | |
|     ref_pic_list_reordering_flag_l1 | 2 | u(1) |
|     if( ref_pic_list_reordering_flag_l1 ) | | |
|       do { | | |
|         reordering_of_pic_nums_idc | 2 | ue(v) |
|         if( reordering_of_pic_nums_idc == 0 \|\| | | |
|           reordering_of_pic_nums_idc == 1 ) | | |
|           abs_diff_pic_num_minus1 | 2 | ue(v) |
|         else if( reordering_of_pic_nums_idc == 2 ) | | |
|           long_term_pic_num | 2 | ue(v) |
|         else if ( reordering_of_pic_nums_idc == 4 \|\| | | |
|           reordering_of_pic_nums_idc == 5) | | |
|           abs_diff_view_idx_minus1 | 2 | ue(v) |
|           use_inter_view_base_flag | 2 | u(1) |
|       } while( reordering_of_pic_nums_idc != 3 ) | | |
|   } | | |
| } | | |

"use_inter_view_base_flag" equal to 0 indicates that for the current view component being reordered, its base representation is to be added into the reference picture list. The value equal to 1 indicates that its enhancement representation is to be added into the reference picture list. The values of "use_inter_view_base_flag" shall be such that all occurrences of the same inter-view reference picture or inter-view only reference picture in the final reference picture list are either all base representations or all enhancement representations.

The reference picture list construction processes are specified as follows. A reference picture list initialization process is invoked as specified in subclause G.8.2.3 of SVC (excluding the reordering process for reference picture lists). After that, an appending process for inter-view reference pictures and inter-view only reference pictures as specified in subclause H.8.2.1 of MVC is invoked with the following modification. During the invocation of the appending process, only the decoded pictures (i.e. enhancement representations) are considered.

The initial reference picture lists RefPicList0 and RefPicList1 (when biPred is equal to 1) are modified by invoking the reordering process for reference picture lists as specified in subclause H.8.2.2.2 for MVC. During the reordering process in subclause H.8.2.2.2, if a view component which is not belonging to the current view is targeted for reordering, when "use_inter_view_base_flag" is equal to 1, the base representation of that view component is used, otherwise (when the flag is equal to 0), the enhancement representation of that view component is used.

Decoding Process

For any view component, the dependency representation with the highest value for "dependency_id" is decoded. The SVC decoding process is used with the modifications specified above.

Leaky Inter-View Prediction

One aspect of the invention allows so-called leaky inter-view prediction. In other words, a prediction block can be formed by a weighted average of a base representation and an enhancement representation of an inter-view reference picture or inter-view only reference picture. This feature can be used to control the potential drift propagation caused by inter-view prediction from quality-scalable (either MGS or FGS) views.

One way to realize leaky inter-view prediction is implemented in a similar way as described above but both base representation and enhancement representation for one inter-view reference picture or inter-view only reference picture are allowed in a reference picture list. Weighted bi-prediction is used to control the averaging between a base representation and an enhancement representation. In this case, only the semantics of the "use_inter_view_base_flag" is to be changed such that the constraint in the semantics does not apply. That is, the values of "use_inter_view_base_flag" need not be such that all occurrences of the same inter-view reference picture or inter-view only reference picture in the final reference picture list are either base representations or enhancement representations. In other words, a final reference picture list can include both a base representation and an enhancement representation of the same inter-view reference picture or inter-view only reference picture.

Pruning Order Indicator

In accordance with embodiments of the present invention, a pruning order indication is provided to be included in the bitstream. The pruning order indicator can be realized with a "priority_id" syntax element included in each NAL unit header. A bitstream subset containing all the NAL units having pruning order values less than or equal to any chosen value is a valid bitstream. Encoders select inter, inter-layer and inter-view prediction references and the value of the pruning order indicator such a way that any bitstream extraction performed according to the pruning order indicator results into a valid bitstream. In particular, the bitstream is encoded such a way that the decoded picture used as inter-view reference for decoding a particular dependency representation (dependency representation A) results from decoding of the dependency representation B regardless of which bitstream subset is obtained based on the pruning order value as long as the dependency representation A is the highest within the respective view and access unit. Note that the number of layer representations of the dependency representation B can be selected, i.e. the greatest value of "quality_id" present for the dependency representation B can be any value that is not greater than the greatest value of "quality_id" in the original bitstream.

An example of the encoder actions to set the pruning order indicator is given in this paragraph. There are two views, view 0 and view 1, both having a base layer and one spatial enhancement layer. The base and enhancement layers of both view 0 and view 1 are of the same spatial resolution. When the enhancement layer of view 1 is decoded, the decoded picture resulting from view 0 (both base and enhancement layers) is used as an inter-view reference. When the base layer of view 1 is decoded (i.e., the enhancement layer is removed from the bitstream), the decoded picture resulting from the base layer of view 0 is used as an inter-view reference. The encoder sets the pruning order indicator of the enhancement layers of both views to be the same. Consequently, a bitstream resulting to decoding of both the base layer and the enhancement layer of view 0 and only base layer of view 1 won't be possible (i.e., cannot be derived using the pruning order indicator).

In one embodiment, it is allowed to have an unequal amount of dependency representations present in different views. This can be used e.g. for asymmetric coding (see the next section). This embodiment can be realized as follows. There is a constraint in clause G.7.4.1.1 of SVC for bitstream subsets:

The bitstream that would be obtained by invoking the bitstream extraction process as specified in subclause G.8.8.1 with pIdTarget equal to any value in the range of 0 to 63, inclusive, tIdTarget equal to any value in the range of 0 to 7, inclusive, dIdTarget equal to any value in the range of 0 to 7, inclusive, and qIdTarget equal to any value in the range of 0 to 15, inclusive, shall be conforming to this Recommendation|International Standard.

In accordance with an embodiment of the present invention, for the proposed codec profile, a similar constraint would be formulated as follows:

The bitstream that would be obtained by invoking the bitstream extraction process as specified in subclause G.8.8.1 with pIdTarget equal to any value in the range of 0 to 63, inclusive, tIdTarget equal to any value in the range of 0 to 7, inclusive, and qIdTarget equal to any value in the range of 0 to 15, inclusive, shall be conforming to this Recommendation|International Standard.

This implies that bitstream extraction based on "dependency_id" may not produce a valid bitstream (and hence bitstream extraction based on "dependency_id" is not done).

Asymmetric Scalable Multi-View Coding

In accordance with embodiments of the invention, an encoder, a decoder and a bitstream for scalable asymmetric multi-view video coding may be provided. When the spatial resolution of a decoded picture used as inter-view reference differs from that of the current picture, resampling of the inter-view reference picture or inter-view only reference picture is inferred and performed.

An example is given to describe this aspect of the various embodiments of the present invention. There are two views, view 0 and view 1, both having a base layer and one spatial enhancement layer. For view 0, the base layer is coded as VGA and the enhancement layer as 4VGA. For view 1, the base layer is coded as QVGA and the enhancement layer as VGA. The encoder uses asymmetric inter-view prediction between the views in both layers. That is, when the enhancement layer of view 1 is decoded, the decoded picture resulting from view 0 (both base and enhancement layers) is downsampled to be used as an inter-view reference. When the base layer of view 1 is decoded (i.e., the enhancement layer is removed from the bitstream), the decoded picture resulting from the base layer of view 0 is downsampled to be used as an inter-view reference. The encoder sets the pruning order indicator of the enhancement layers of both views to be the same. Consequently, a bitstream resulting to decoding of both the base layer and the enhancement layer of view 0 and only base layer of view 1 won't be possible (i.e., cannot be derived using the pruning order indicator).

Figure 4:
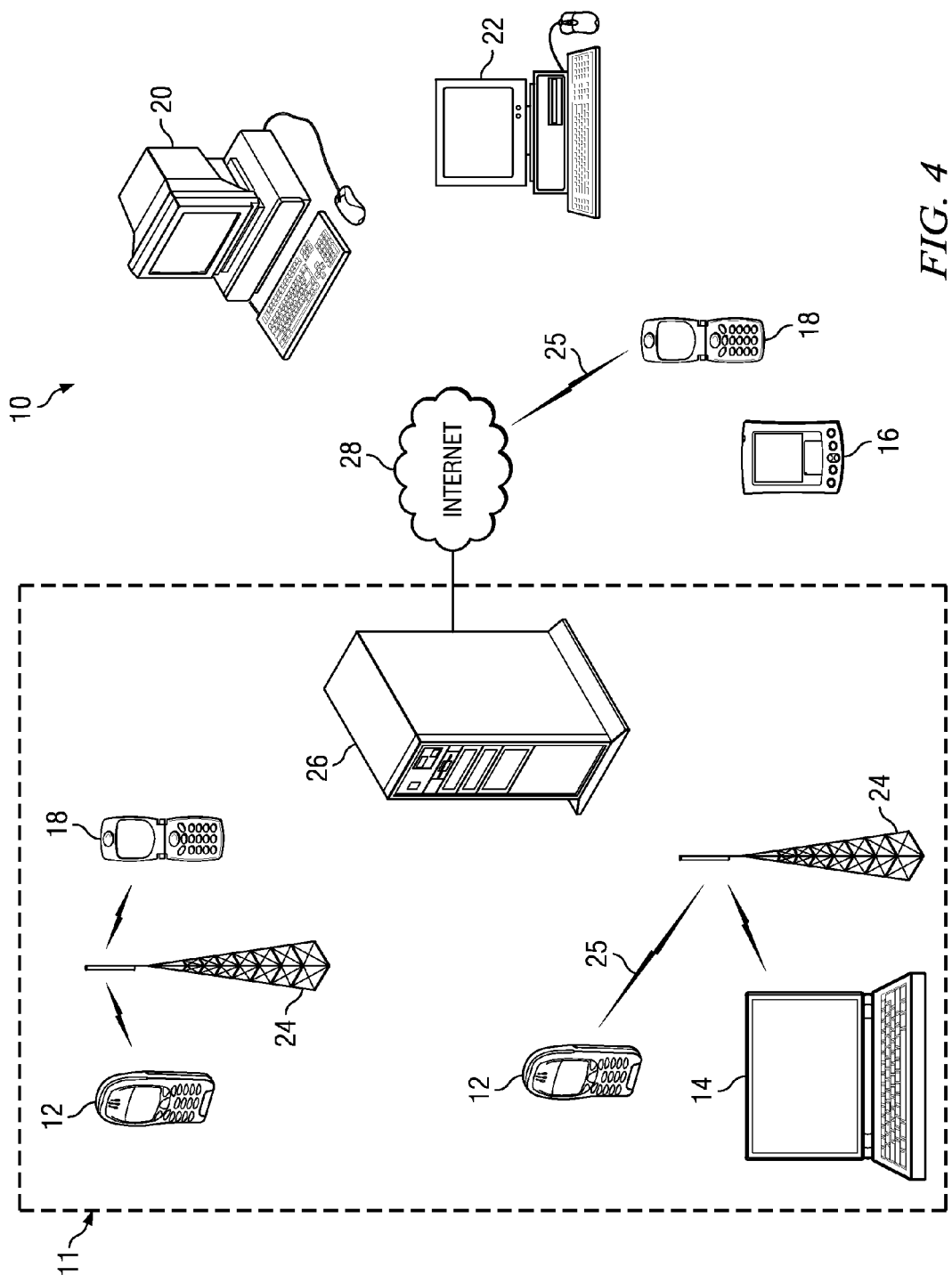
FIG. 4 is an overview diagram of a system within which various embodiments of the present invention may be implemented.

FIG. 4 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 5:
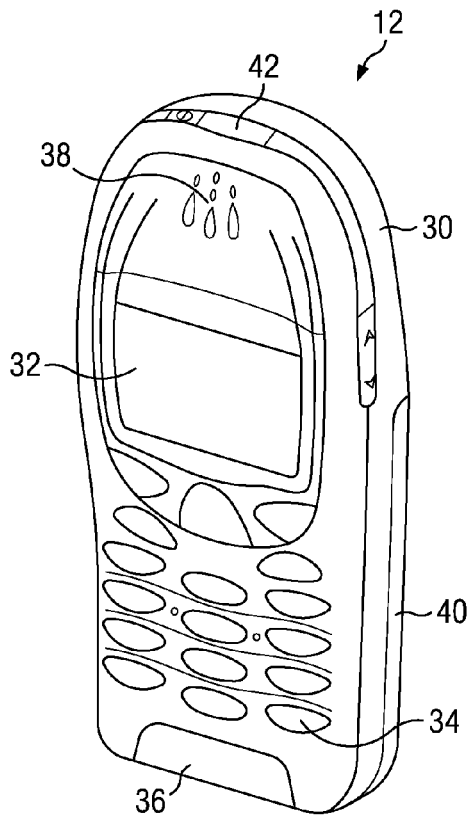
FIG. 5 illustrates a perspective view of an exemplary electronic device which may be utilized in accordance with the various embodiments of the present invention.
Figure 6:
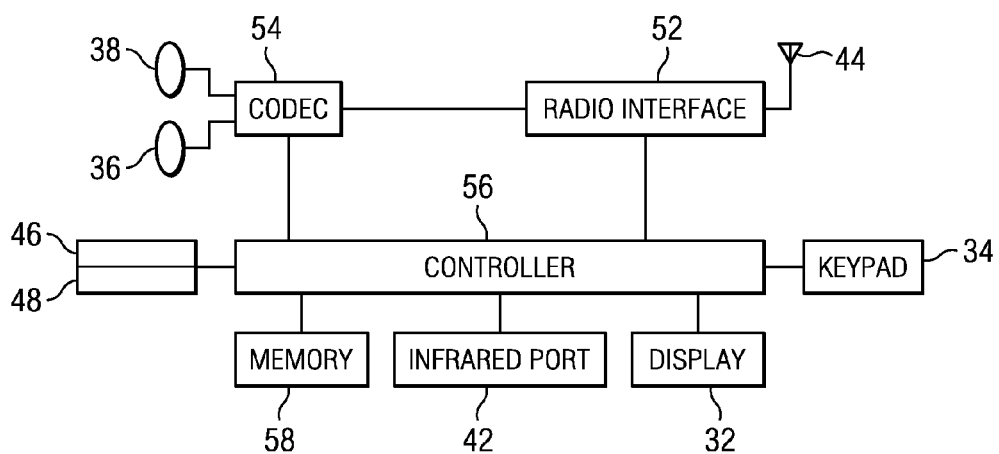
FIG. 6 is a schematic representation of the circuitry which may be included in the electronic device of FIG. 5.

FIGS. 5 and 6 show one representative electronic device 28 which may be used as a network node in accordance to the various embodiments of the present invention. It should be understood, however, that the scope of the present invention is not intended to be limited to one particular type of device. The electronic device 28 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Figure 7:
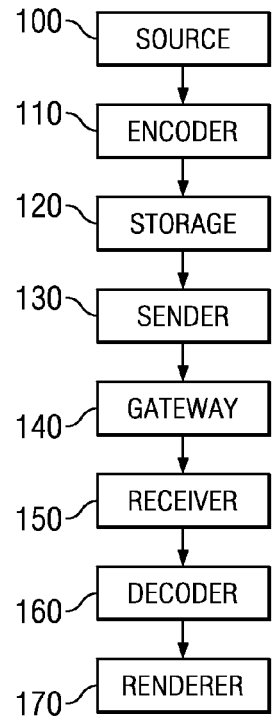
FIG. 7 is a graphical representation of a generic multimedia communication system within which various embodiments may be implemented.

FIG. 7 is a graphical representation of a generic multimedia communication system within which various embodiments may be implemented. As shown in FIG. 7, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 7 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are multiple coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

A sender 130 according to various embodiments may be configured to select the transmitted layers for multiple reasons, such as to respond to requests of the receiver 150 or prevailing conditions of the network over which the bitstream is conveyed. A request from the receiver can be, e.g., a request for a change of layers for display or a change of a rendering device having different capabilities compared to the previous one.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
    encoding a first scalability unit of a first view component based at least in part on a first picture of a first view into a bitstream;
    predicting a second scalability unit of the first view component from the first scalability unit of the first view component;
    encoding the second scalability unit of the first view component into the bitstream;
    encoding a second view component based at least in part on a first picture of a second view into the bitstream;
    predicting a first scalability unit of the second view component from the first scalability unit of the first view component; and
    encoding the first scalability unit of the second view component into the bitstream;

wherein the first scalability unit of the first view component is of different spatial resolution than the first scalability unit of the second view component and the second scalability unit of the first view component is of different spatial resolution than the second scalability unit of the second view component.

2. The method of claim 1, further comprising:
predicting a second scalability unit of the second view component from the first scalability unit of the second view component;
predicting the second scalability unit of the second view component from the second scalability unit of the first view component; and
encoding the second scalability unit of the second view component into the bitstream.

3. The method of claim 1, further comprising:
encoding into the bitstream a first indication relating to whether the first scalability unit of the second view component is predicted from the first scalability unit of the first view component.

4. The method of claim 1,
further comprising:
resampling the first scalability unit of the first view component in connection with predicting the first scalability unit of the second view component; and
resampling the second scalability unit of the first view component in connection with predicting the second scalability unit of the second view component.

5. An apparatus, comprising a processor and a memory storing computer code therein, the memory and computer code being configured to, with the processor, cause the apparatus to at least:
encode a first scalability unit of a first view component based at least in part on a first picture of a first view into a bitstream;
predict a second scalability unit of the first view component from the first scalability unit of the first view component;
encode the second scalability unit of the first view component into the bitstream;
encode a second view component based at least in part on a first picture of a second view into the bitstream;
predict a first scalability unit of the second view component from the first scalability unit of the first view component; and
encode the first scalability unit of the second view component into the bitstream;
wherein the first scalability unit of the first view component is of different spatial resolution than the first scalability unit of the second view component and the second scalability unit of the first view component is of different spatial resolution than the second scalability unit of the second view component.

6. The apparatus of claim 5, wherein the apparatus is further caused to:
predict a second scalability unit of the second view component from the first scalability unit of the second view component;
predict the second scalability unit of the second view component from the second scalability unit of the first view component; and
encoding the second scalability unit of the second view component into the bitstream.

7. The apparatus of claim 5, wherein the apparatus is further caused to:
encode into the bitstream a first indication relating to whether the first scalability unit of the second view component is predicted from the first scalability unit of the first view component.

8. The apparatus of claim 5, wherein
the apparatus is further caused to:
resample the first scalability unit of the first view component in connection with predicting the first scalability unit of the second view component; and
resample the second scalability unit of the first view component in connection with predicting the second scalability unit of the second view component.

9. A computer program product comprising a non-transitory computer-readable medium storing computer code portions therein, the computer code portions being configured to, upon execution, cause an apparatus to at least:
encode a first scalability unit of a first view component based at least in part on a first picture of a first view into a bitstream;
predict a second scalability unit of the first view component from the first scalability unit of the first view component;
encode the second scalability unit of the first view component into the bitstream;
encode a second view component based at least in part on a first picture of a second view into the bitstream;
predict a first scalability unit of the second view component from the first scalability unit of the first view component;
encode the first scalability unit of the second view component into the bitstream;
wherein the first scalability unit of the first view component is of different spatial resolution than the first scalability unit of the second view component and the second scalability unit of the first view component is of different spatial resolution than the second scalability unit of the second view component.

10. The computer program product of claim 9, wherein the computer code portions are further configured to, upon execution, cause the apparatus to:
predict a second scalability unit of the second view component from the first scalability unit of the second view component;
predict the second scalability unit of the second view component from the second scalability unit of the first view component; and
encode the second scalability unit of the second view component into the bitstream.

11. The computer program product of claim 9, wherein the computer code portions are further configured to, upon execution, cause the apparatus to:
encode into the bitstream a first indication relating to whether the first scalability unit of the second view component is predicted from the first scalability unit of the first view component.

12. The computer program product of claim 9, wherein the computer code portions are further configured to, upon execution, cause the apparatus to:
resample the first scalability unit of the first view component in connection with predicting the first scalability unit of the second view component; and
resample the second scalability unit of the first view component in connection with predicting the second scalability unit of the second view component.

* * * * *